United States Patent
Burcham et al.

(10) Patent No.: US 9,491,231 B1
(45) Date of Patent: Nov. 8, 2016

(54) MOBILE COMMUNICATION DEVICE STATEFUL APPLICATIONS SYSTEM

(71) Applicant: Sprint Communications Company L.P., Overland Park, KS (US)

(72) Inventors: Robert H. Burcham, Overland Park, KS (US); Jason R. Delker, Olathe, KS (US); Geoffrey A. Holmes, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 173 days.

(21) Appl. No.: 14/316,572

(22) Filed: Jun. 26, 2014

(51) Int. Cl.
*G06F 15/16* (2006.01)
*H04L 29/08* (2006.01)
*H04W 4/00* (2009.01)

(52) U.S. Cl.
CPC .......... *H04L 67/10* (2013.01); *H04L 67/1095* (2013.01); *H04W 4/003* (2013.01)

(58) Field of Classification Search
None
See application file for complete search history.

(56) References Cited

U.S. PATENT DOCUMENTS

| | | | | |
|---|---|---|---|---|
| 2004/0181591 A1* | 9/2004 | Yu | ........................... | H04L 12/14 709/217 |
| 2012/0129503 A1* | 5/2012 | Lindeman | ............ | H04W 4/001 455/414.1 |
| 2013/0007499 A1* | 1/2013 | Moy | ..................... | G06F 3/1423 713/400 |
| 2013/0318158 A1* | 11/2013 | Teng | ........................ | H04L 67/42 709/203 |
| 2014/0123257 A1* | 5/2014 | Gordon | ............... | H04L 67/1095 726/7 |
| 2014/0156784 A1* | 6/2014 | Buck | ................... | H04L 67/1095 709/217 |
| 2014/0236846 A1* | 8/2014 | Melika | ................. | G06Q 50/184 705/310 |
| 2014/0289195 A1* | 9/2014 | Chan | ......................... | G06F 9/54 707/620 |

* cited by examiner

*Primary Examiner* — Thomas Dailey

(57) ABSTRACT

A mobile communication device. The mobile communication device comprises a radio transceiver, a processor, a memory, and a subscription applications management application stored in the memory. When executed by the processor, the management application monitors a subscription applications account status, presents a catalog of a plurality of subscription applications available for downloading via the radio transceiver, and responsive to a disabled status of the subscription applications account status, blocks execution of downloaded subscription applications. The management application further receives a request to export state information of a specified downloaded subscription application to one of a subscription application executing on another electronic device, a corresponding owned application executing on the mobile communication device, or a corresponding owned application executing on another electronic device, and exports state information of the specified downloaded subscription application.

20 Claims, 9 Drawing Sheets

MOBILE COMMUNICATION DEVICE STATEFUL APPLICATIONS SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be used to make telephone calls and to connect to the Internet. Mobile communication devices may provide an execution platform for a variety of applications such as games, internet browsers, navigation tools, social networking tools, and others. In some cases, users may be able to select applications stored in an application repository or in an application store, download the application, and install them on the mobile communication device using an application installer provided by an operating system of the mobile communication device. For example, a mobile communication device having an Android operating system may use a Google Play application to download and install an application.

Some applications are associated with a state. For example, a game may be associated with a point score state that changes over time as the user plays the game during a single session and that may accumulate over multiple sessions. A game may grant a player access to higher levels as the user becomes more proficient and/or as the user completes game challenges or move sequences. A game may provide the player an ability to build a user profile or personality over time. A game may involve the player building, within the imaginary world of the game, a business enterprise, a defensive position, or other like item. An application may store interactions of the user that may be useful for performing future services for the user, for example a navigation program may store previously entered navigation destinations. Application state may include one or more of game score, accumulated game score, game player level, articulated user profile or personality, stored navigational locations, and the like.

SUMMARY

In an embodiment, a mobile communication device is disclosed. The mobile communication device comprises a radio transceiver, a processor, a memory, and a subscription applications management application stored in the memory. When executed by the processor, the management application monitors a subscription applications account status, presents a catalog of a plurality of subscription applications available for downloading via the radio transceiver, and responsive to a disabled status of the subscription applications account status, blocks execution of downloaded subscription applications. The management application further receives a request to export state information of a specified downloaded subscription application to one of a subscription application executing on another electronic device, a corresponding owned application executing on the mobile communication device, or a corresponding owned application executing on another electronic device, and exports state information of the specified downloaded subscription application.

In an embodiment, another mobile communication device is disclosed. The mobile communication device comprises a radio transceiver, a processor, a memory, a subscription applications management application stored in the memory, and a subscription application stored in the memory, wherein the subscription application comprises a wrapper. When executed by the processor, the management application presents a catalog of a plurality of subscription applications available for downloading via the radio transceiver and receives a request to export state information of a specified downloaded subscription application to one of a subscription application executing on another electronic device or a corresponding owned application executing on the mobile communication device. The application further exports state information of the specified downloaded subscription application. When the subscription application is executed by the processor, the wrapper checks a status of a subscription associated with the subscription applications management application and responsive to a disabled status of the subscription, disables full execution of the subscription application.

In an embodiment, a method of managing subscription applications is disclosed. The method comprises reading a catalog of subscription applications stored in a memory of a mobile communication device, presenting the catalog of subscription applications on a display of the mobile communication device, and receiving a selection of a subscription application from among a plurality of subscription applications presented on the display. The method further comprises determining if a subscription account associated with the catalog of subscription applications is enabled. Responsive to determining an enabled status of the subscription account, downloading the selected subscription application via a radio transceiver of the mobile communication device by a subscription applications management application, where the subscription applications management application is not encapsulated in an operating system of the mobile communication device. The method further comprises maintaining a state of the selected subscription application, receiving a request to export the state of the selected subscription application, and exporting the state of the selected subscription application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
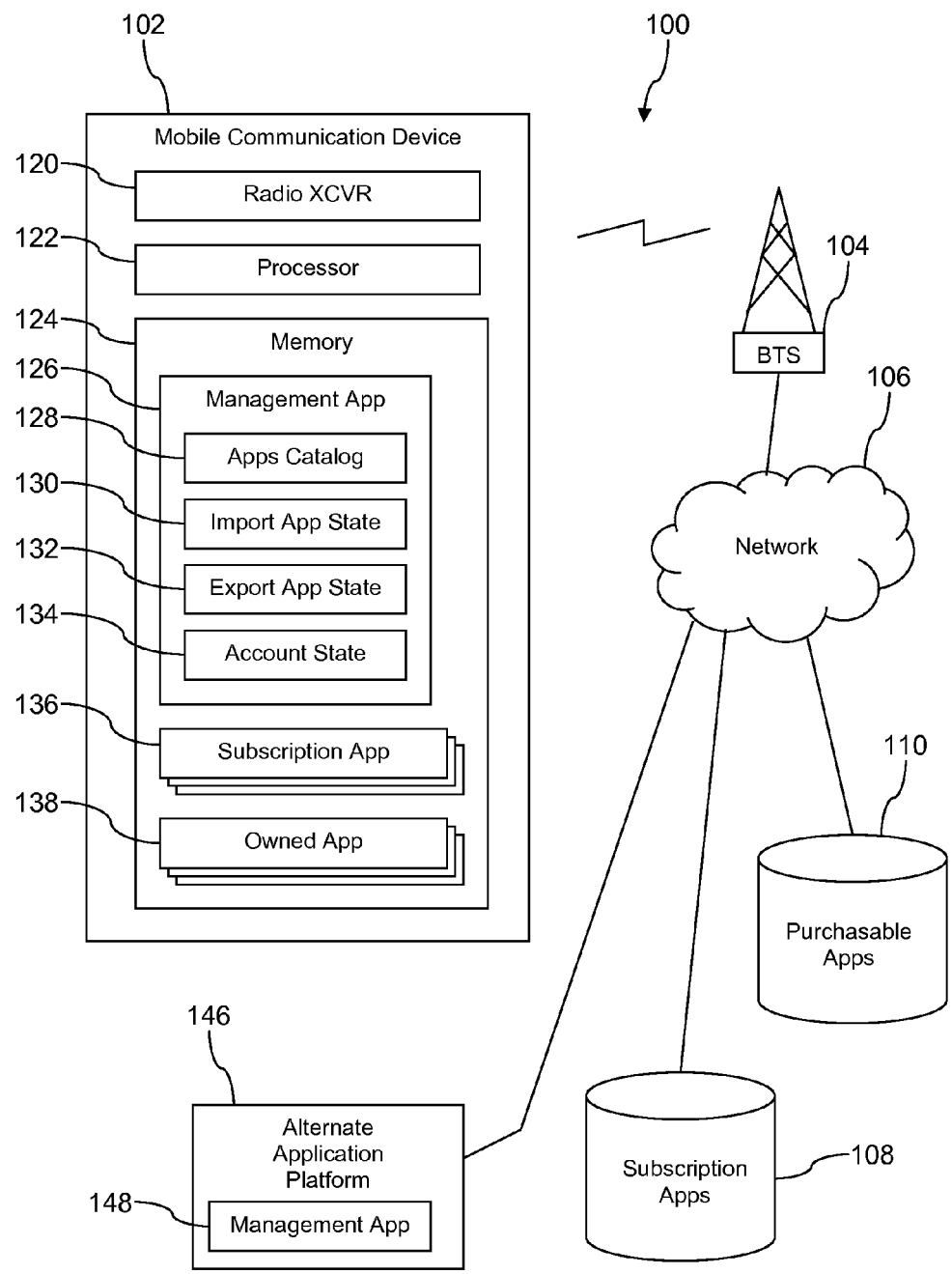
FIG. 1A is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Challenges may be experienced by users of electronic devices who may wish to use the same or related applications on different platforms. The conventional model is to think of these applications installed on different platforms as completely separated, as though existing on isolated islands. But users who build state or status in one of the applications may want to enjoy the benefits of that state or status in the corresponding application on a different electronic device. For example, a user may install a game application on a computer and a corresponding version of the game application on a mobile phone. The user will not appreciate being unable to enjoy the benefits of earned skill levels and/or accumulated scores when alternating game play between the two different electronic devices. Providing a system and/or framework that promotes bridging, sharing, transferring state between corresponding applications installed on different electronic devices or execution platforms can promote greater user adaption of technology and acceptance of multi-platform applications. Additionally, this capability may promote ease of selling different ownership or leasing models for application usage.

The present disclosure teaches a framework for exporting a state of an application from a first application to a second corresponding application. Because users may have built a state in an application over time, investing effort and creativity in building that state, it is helpful to be able to preserve that state by exporting the state from the application that executes on a first platform and importing the state by a corresponding application that executes on a different execution platform. For example, a user may play a game that executes on his mobile phone while on vacation and may advance through one or more game levels. When the user resumes playing the same game (e.g., a second corresponding application) installed on a home computer or through a gaming system connected to a large screen television, he doesn't want to have to re-earn those gaming levels. Additionally, the framework may be extended, using the state exporting and importing functionality, to provide storing application state on an external server. This may be useful when an execution platform, for example a mobile phone, is lost, damaged, or replaced. The user may execute an import function on his replacement and/or new device to restore the state of his applications by exporting the stored state of those applications from the external server.

As used herein, state may comprise a variety of information. State may comprise a token that authorizes play at an advanced level of a game. State may comprise an accumulated game score or other accumulated numerical values. State may comprise preparations the user has undertaken in the application, for example one or more of defining avatars, importing photographs, editing photographs, inputting textual information, building a personal profile, building a fantasy profile, or the like. State may comprise a history of user actions within the application. State may comprise one or more addresses input into an application, for example addresses input into a navigation application. State may comprise search criteria, for example search criteria input by the user to define preferences of music, food, entertainment, or the like.

The disclosure further teaches a framework for delivering, installing, and managing a plurality of applications to users on a subscription basis. In an embodiment, the framework may serve subscribers that pay a monthly fee to download and use any applications listed in a catalog of subscription applications. For example, a user may pay $9.99 per month and be able to select from and download any number of subscription applications from among a repository of 100 applications, 200 applications, or more applications. In an embodiment, the framework allows the subscriber to install subscription applications on two or more execution platforms, for example the same subscription application may be installed (e.g., stored and configured) on two execution platforms at the same time. For example, the subscriber may install subscription applications on his mobile phone as well as on his laptop computer. The subscriber may download and install the same subscription application on two different platforms, for example his mobile phone and his laptop computer. In some contexts, this framework may be referred to as an apps unlimited framework or an apps unlimited system.

In an embodiment, the subscription applications comprise a subscription application wrapper around a core application, and the wrapper manages the digital rights management (DRM) rules associated with the subscription applications. For example, the wrapper may be used to restrict the installation of applications for a given subscriber to a maximum of two devices or some other maximum number of devices. The wrapper may be used to block execution of a subscription application and to block downloading of a subscription application from the subscription application repository if the subscription account is not in good standing, if the account is inactive, or in response to some other trigger or state. For example, in an embodiment, the wrapper may block execution of the subscription application and block downloading of a subscription application from the subscription application repository if the subscription account is in arrears and the monthly subscription fee is not paid. For example, in an embodiment, the wrapper may block execution of the subscription application and block downloading of a subscription application from the subscription application repository during certain excluded times of the day, possibly to reduce load on the wireless communication network during periods of maximum usage or during emergencies.

In an embodiment, the subscription application may check a flag or status parameter that is stored in the wireless communication network, for example at a server computer accessed via the wireless communication network. The subject server may set the flag to one of an enabled or disabled value based on one or more rules, as described above. For example, the subject server may periodically evaluate the payment status of the subscription account and set the flag accordingly; may periodically set the flag for different times of day; may set the flag asynchronously (e.g., in response to an unscheduled event, such as an emergency or an unanticipated network overload). In an embodiment, designing the subscription application framework or system (e.g., the apps unlimited framework) to make the server computer responsible for setting the flag may have advantages of security and fraud prevention.

A subscription application may have a name that is similar to but different from a name of a corresponding application that does not comprise the wrapper, for example a corresponding application that may be purchased from a purchasable application repository. Such a purchased application may be referred to in some contexts herein as an owned application. For example, the name of the subscription application may be formed by extending the name of the corresponding owned application, for example extended by adding a prefix. In an embodiment, the operating system of the execution platform would treat the two application names as unrelated applications.

In an embodiment, the access to the subscription applications is mediated by a subscription management application. The management application provides a catalog of subscription applications that a subscriber may request for downloading from a subscription application repository. The management application may provide functionality for downloading and installing subscription applications from a subscription application repository, without relying on an application installation tool provided in the operating system of the mobile communication device. For example, the management application may download and install applications without using a Google Play application that is provided by the Android operating system of a mobile communication device.

The management application may further provide functionality for exporting state from an application installed on the electronic device it executes on to another electronic device. The management application may also provide functionality for importing state from an application installed on another electronic device into an application installed on the electronic device the management application executes on. The management application may provide import state and export state functionality by invoking an application programming interface (API) built into all the subscription applications.

In an embodiment, the management application may provide some of the functionality described above as being performed by the wrapper of a subscription application. For example, the management application may keep track of an application subscription account status and block attempts to launch any subscription application installed on the mobile communication device and block attempts to download subscription applications from the subscription application repository if the subscription account bill is not paid up. The management application may check the payment status of the subscription account on a periodic basis synchronized with a subscription period, for example a month or some other period. Alternatively, in an embodiment, the management application may check the status flag stored in the wireless communication network and set by a server computer, as described above, and may block attempts to download or execute subscription applications if the flag is set to a disabled state.

In an embodiment, applications corresponding to the core of a subscription application may be purchased from a different application repository, for example from a purchasable application repository. A user may choose to do this after he has conducted a trial of the corresponding subscription application and he wishes to continue using the application after letting his application subscription expire or after the subscription application is removed from the subscription applications supported by the framework (e.g., a developer of the subject subscription application may terminate his business agreement with the subscription applications service provider).

An owned application or a purchased application may be substantially similar to the corresponding subscription application, with the exception that the owned application does not have the subscription wrapper and hence does not check the subscription account status of the user before permitting launch of the subject owned application. Additionally, the owned application may comprise the complete set of levels of an application, for example all of the player levels of a game. A subscription application may comprise an incomplete set of levels of the application. For example, a subscription gaming application may install initially with 5 of 15 game levels. When a user advances to the highest installed level (e.g., level 5 in this example), a message may be presented inviting the user to pay for an incremental installation of additional levels or to purchase the corresponding purchase application.

Alternatively, an owned application installed on the user's electronic device may have less functionality or support fewer layers than a subscription application, and a user who has begun by using an owned application may wish to download a corresponding subscription application and transfer state from the originally purchased application to the corresponding downloaded subscription application. Alternatively, a free version (for example trial version) of a purchasable application installed on the user's electronic device may have less functionality or support fewer layers than the subscription application, and the user who has begun by using the free application may wish to download a corresponding subscription application and transfer state from the originally purchased application to the corresponding downloaded subscription application.

Turning now to FIG. 1A, a communication system 100 is described. In an embodiment, system 100 comprises a mobile communication device 102, a base transceiver station 104 or an enhanced Node B (eNB), a network 106, a subscription application repository 108, and a purchasable application repository 110. The mobile communication device 102 may be a mobile phone, a smart phone, a personal digital assistant (PDA), a media player, a wearable computer, a headset computer, a laptop computer, a notebook computer, a tablet computer, or another intelligent electronic device. The mobile communication device 102 may communicate with a macrocellular radio access network of BTSs 104 using a radio transceiver 120 of the mobile communication device 102. The mobile communication device 102 may comprise other radio transceivers (not shown), for example a WiFi radio transceiver, a Bluetooth® radio transceiver, a near field communication (NFC) radio transceiver, or other radio transceiver.

The radio transceiver 120 may communicate with the BTS 104 or eNB using a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another macrocellular wireless communication protocol. The BTS 104 provides a wireless link to the mobile communication device 102 and communications connectivity to the network 106. The network 106 comprises one or more private networks, one or more public networks, or a combination thereof.

The mobile communication device 102 further comprises a processor 122 and a memory 124. In an embodiment, the memory 124 comprises or stores a subscription application management application 126 (referred to hereinafter as the subscription management application 126), optionally one or more subscription applications 136, and optionally one or more owned applications 138. In an embodiment, the subscription management application 126 may comprise a subscription applications catalog 128, an import application state function 130, an export application state function 132, and an optional account state 134. It will be appreciated that the system 100 may comprise any number of BTSs 104 or eNBs and any number of mobile communication devices 102.

The system 100 may further comprise an alternate subscription application platform 146. The alternate subscription application platform 146 may be associated with the mobile communication device 102, for example the platform 146 and the device 102 may be owned by the same subscriber and/or may be registered to the same subscription application account. The system 100 may comprise any number of alternate subscription application platforms 146. The alternate subscription platform 146 comprises a second subscription management application 148 that provides functionality like the subscription management application 126 installed on the mobile communication device 102. In an embodiment, the subscription management application 126 and the second subscription management application 148 are paired with each other and collaborate to enforce subscription rules.

The subscription management application 126 may be invoked or executed by selecting a control button of the device 102, for example by touching a corresponding icon on a touchscreen display of the device 102. The subscription management application 126 may present controls on the device 102 that enable the user to open and view the subscriptions applications catalog 128. The catalog 128 may present controls for selecting subscription applications for downloading and installation on the device 102. The application catalog 128 may present controls for selecting presentation of supporting details about one or more of the subscription applications listed or presented in the catalog 128.

When a subscription application in the catalog 128 is selected for downloading, the subscription management application 126 may check the value of the account state 134. When the account state 134 is enabled, current, or up-to-date, then the management application 126 may communicate with the subscription application repository 108 to download the subject subscription application to the device 102. When the subject subscription application 136 has been downloaded to the device 102, the management application 126 may install it in the memory 124 and add an icon associated with the downloaded subscription application 136 in a screen of the device 102. When the icon is selected, for example is touched by a user of the device 102, the subscription application 136 may be invoked by the operating system to execute. In an embodiment, the management application 126 downloads and installs the subscription application 136 without using an installation tool provided by an operating system of the device 102, for example without using a Google Play tool.

The catalog 128 may be periodically updated by the subscription management application 126, for example once per day, once per week, once per month, or on some other schedule. Alternatively, the catalog 128 may update asynchronously, for example when the catalog 128 is launched it may access (or the subscription management application 126 may access) the subscription application repository 108 to download any changes in the subscriptions applications available. The changes may be new descriptions of the subscription applications. The changes may be subscription applications added to and/or subscription applications removed from the subscription application repository 108.

When the account state 134 is not enabled, is not current, or is in arrears, the subscription management application 126 may present a message on the display of the device 102 to the effect that the requested download and installation of the selected subscription application will not be performed because the subscription applications account of the device 102 has an overdue payment pending or is disabled for some other reason. In an embodiment, the subscription management application 126 may further present a control to initiate a payment to bring a subscription applications account up to date and therefore to complete the download and installation of a subscription application.

In an embodiment, the account state 134 may have either an enabled state value or a disabled state value. The state value may be determined based on one or more independent rules. One rule may be the payment status of the account. Another rule may be a time-of-day rule. For example, the account state 134 may have a disabled status during the hours of 8 AM to 6 PM to avoid congesting a communication network during high communication network loading due to business activity. Another rule may be related to the existence of special circumstances, for example during an emergency the account state 134 may be assigned a disabled value to avoid congestion of a communication network during the emergency. The subscription management application 126 may evaluate the rules periodically to set the value of the account state 134. Alternatively, the account state may be evaluated by a server computer (e.g., server computer 150 shown in FIG. 1B and discussed further below), and the subscription management application 126 may periodically access or read the account state from that server computer and store the value in the account state 134. Alternatively, the account state 134 may not be stored by the mobile communication device 102, and the subscription management application 126 and/or subscription applications 136 may access and/or read the account status from the server computer as needed.

Figure 1B:
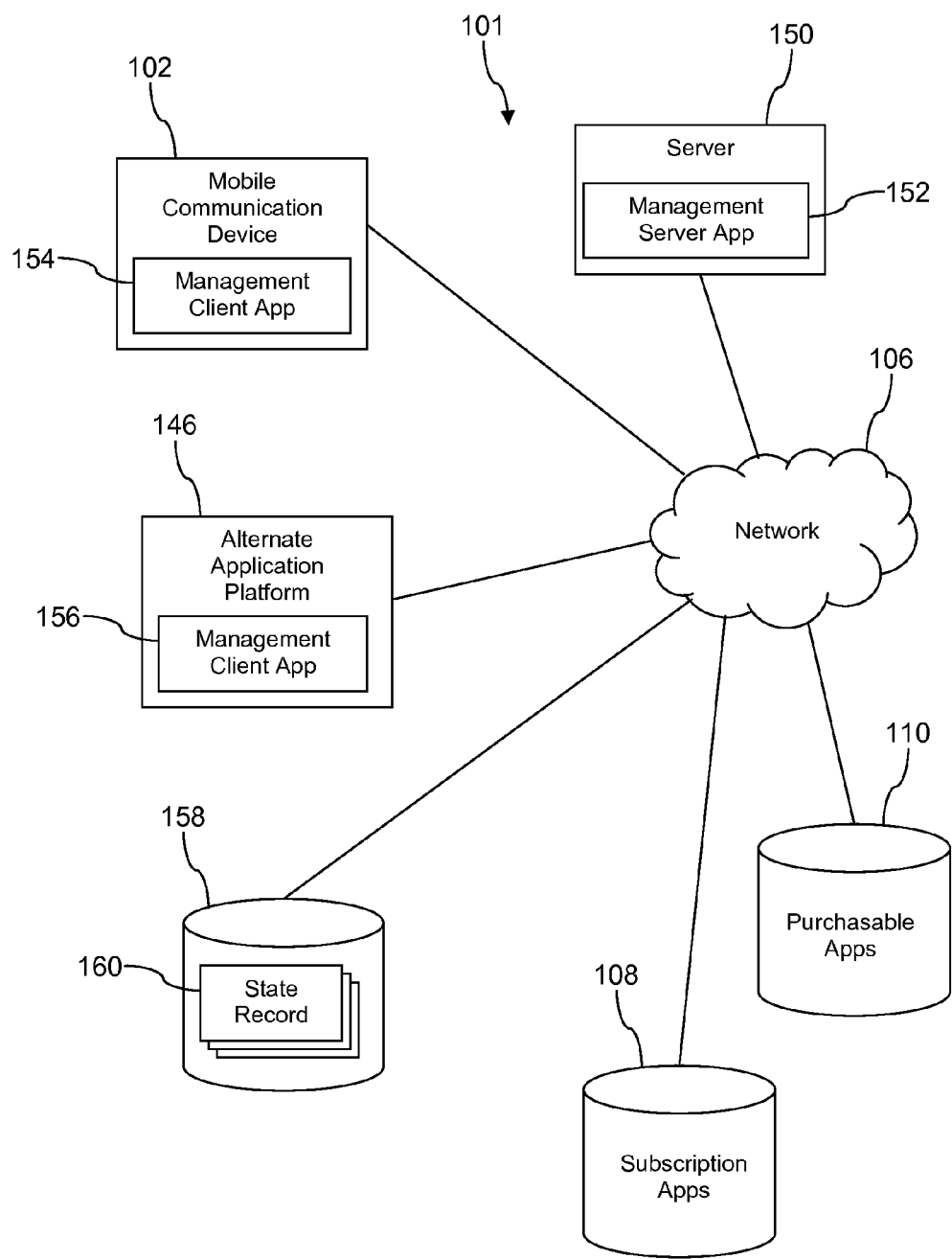
FIG. 1B is an illustration of an alternative configuration of the communication system according to an embodiment of the disclosure.

In an embodiment, the subscription management application 126 may request a status of the subscription application account from a management server application 152 that executes on a server computer 150, as illustrated in FIG. 1B. The management application 126 may request the status of the subscription application account on a periodic basis that correlates with the payment due dates of the account. For example, if the payment on the account is due on the first of the month, the subscription management application 126 may query the management server application 152 shortly after the first of the month. If the account is paid up to date, the subscription management application 126 may assure the account state 134 is set to an appropriate value and may schedule checking account status again a month later. If the account is not paid up to date, the subscription management application 126 may periodically query the management server application 152 for the account status, for example once an hour, once a day, or once a week. Alternatively, the subscription management application 126 may check the account status when a user attempts to download a subscription application again from the subscription application repository 108 or attempts to execute a subscription application 136. The subscription applications account may also be paid via an on-line payment mechanism or may be aggregated to a periodic wireless communication subscription account bill.

When a subscription application 136 is selected for execution, for example by touching an icon associated with the subscription application 136 presented on the display of the device 102, the account state 134 is checked to assure the account is current before the subscription application 136 is executed. This check may be built into the wrapper of the subscription application 136, where the subscription application 136 may invoke an application programming interface (API) call to an account state check function provided by the subscription management application 126. Alternatively, the execution of the subscription application 136 may be mediated by the subscription management application 126, and the subscription management application 126 may access the account state 134 and evaluate currency of the account itself before allowing launch of the selected subscription application 136. In an embodiment, the subscription management application 126 may support a partial or incomplete launching of the selected subscription application 136 in the event that the account state 134 is disabled. Such partial execution may be used to present notification of the account state 134 or to provide an interface for a user to take remedial steps (e.g., to pay an account balance, to upgrade a subscription service to ease daytime restrictions either permanently or on a single day basis). Partial execution may support exporting of state from a subscription application 136 to a corresponding application on another electronic device, for example alternate application platform 146, or to a data store 158 as illustrated in FIG. 1B.

One or more of the subscription applications 136 or the owned applications 138 may maintain, build, or accumulate a state. The state may comprise a proficiency or difficulty level in a game. The state may comprise an accumulated score in the game. The state may comprise personalization information such as one or more of a name, preferences, activities, education, age, or other like personal profile information. The state may comprise one or more photograph or avatar. The state may comprise a level of stores retained in the application, for example one or more of credits granted to and retained by the user of the application, stores remaining to a player in a game, points accumulated by a player in a game, or the like. The state may comprise addresses or keywords or names entered into the application by the user of the application. The state may comprise portions of a history of actions taken while the application was executing. The state may comprise other information.

One or more of the subscription applications 136 or the owned applications 138 may provide APIs for exporting or importing state from a corresponding application. Corresponding applications or associated applications are applications that generally deliver the same or like functionality but are installed on different execution platforms 102, 146 and/or a first one of the applications is an owned application without the subscription application wrapper and a second one of the applications is a subscription application that has the subscription application wrapper.

For example, an export API of a first application may be invoked to export the state of the first application to a second application, wherein the first application and the second application are corresponding or associated applications. For example, the first application may be a subscription application 136 executing on the device 102, and the second application may be the same subscription application 136 (e.g., the same game, the same navigation application, the same social networking application) executing on the alternative application platform 146. It is understood that transferring state between applications may entail a reciprocal execution of the export API on a first device and execution of the import API on a second device. As another example, the first application may be a subscription application 136 executing on the device 102 and the second application may be an owned application 138 executing on the same device 102. In an embodiment, the applications 136, 138 may support exporting state to a data store coupled to the network 106, for example a state data store 158 illustrated in FIG. 1B, and importing state from the state data store 158. This functionality could provide back-up for possible failure of the device 102 and/or the alternative application platform 146. The importing and exporting of state of applications may be supported both by the export application state function 132 and the account state function 134 of the subscription management application 126 as well as supported by APIs provided by the applications themselves.

Turning now to FIG. 1B, a system 101 is described. The system 101 comprises the mobile communication device 102, the alternate application platform 146, the network 106, the subscription application repository 108, and the purchasable application repository 110 of FIG. 1A. In system 101, the mobile communication device 102 does not comprise the subscription management application 126 of FIG. 1A but instead comprises a subscription management client application 154. Likewise, the alternate application platform 146 does not comprise the second subscription management application 148 of FIG. 1A but instead comprises a second subscription management client application 156. The system 101 further comprises a server computer 150 that executes a subscription management server application 152, referred to hereinafter at the management server application 152.

In system 101, at least some of the subscription application management functions described as provided by the subscription management application 126 with reference to FIG. 1A are in system 101 instead provided by the management server application 152. For example, the management server application 152 may periodically send a message characterizing changes in the purchasable application repository 110 to the subscription management client applications 154, 156, whereby the subscription applications catalog 128 may be updated. The management server application 152 may send delta messages to the subscription management client applications 154, 156 when a change occurs in the subscription application repository 108, either immediately (e.g., asynchronously) or during a preferred messaging time interval (e.g., quasi-asynchronously) such as during early morning hours when the network 106 and/or the BTSs 104 are lightly loaded. The delta messages may contain only information about the changes in the subscription application repository 108.

The management server application 152 may provide account state 134 information to the subscription management client applications 154, 156 periodically, for example as periodic subscription fees fall due, and/or asynchronously in response to queries from the subscription management client applications 154, 156. The management server application 152 may query an account data store or account server (not shown) to determine the account status of each of the subscription application accounts of all subscribers, for example during a time of light loading of the network 106.

The system 101 may support an application state backup functionality. This may be useful for recovery of application state when a mobile communication device 102 or the alternate application execution platform 146 is lost, stolen, exchanged, or destroyed.

In an embodiment, the applications 136, 138 may support exporting state to a data store coupled to the network 106, for example a state data store 158 illustrated in FIG. 1B, and importing state from the state data store 158. Alternatively, the management server application 152 and the management client application 154, 156 may provide supporting or mediating services for this export and import functionality. This functionality could provide back-up for possible failure of the device 102 and/or the alternative subscription application platform 146. If a first device 102 is stolen or run-over by a car, the user may buy a replacement device 102, and the back-up functionality could selectively reinstall the subscription applications that had been installed in the original device 102 and then export the state of the applications to the replacement device 102. This back-up could be provided using hooks and levers provided for exporting and importing state between the mobile communication device 102 and the alternate application subscription platform 146 and between corresponding subscription applications 136 and owned applications 138.

The mobile communication device 102 and the alternate subscription application platform 146 could be configured to export state from the applications 136, 138 to the state data store 158 as state records 160. Export of state may be initiated periodically or asynchronously by the applications 136, 138 or by the subscription management application 126, 148 or the management client application 154, 156. State would not be exported by inactive applications 136, 138, because their state would only change when they were active. The state back-up functionality may be a valuable service that the management server application 152 could provide that would generate additional revenues for a telecommunications service provider enterprise.

When a previously installed subscription application 136 was removed from the subscription application repository 108, the subscription management server application 152 could interoperate with the mobile communication devices 102 and the alternate subscription application platforms 146 that had installed the subject subscription application 136 to have it removed. The subscription management server application 152 may command the subscription management client applications 154, 156, as the particular case may be, to present a message or post a notification for the user of the device 102 or platform 146 about the removal of the subject subscription application 136. The user may be provided an application to first back-up the state of the subscription application 136 to the state data store 158 and/or to purchase the associated owned application 138 from the purchasable application repository 110.

Figure 2:
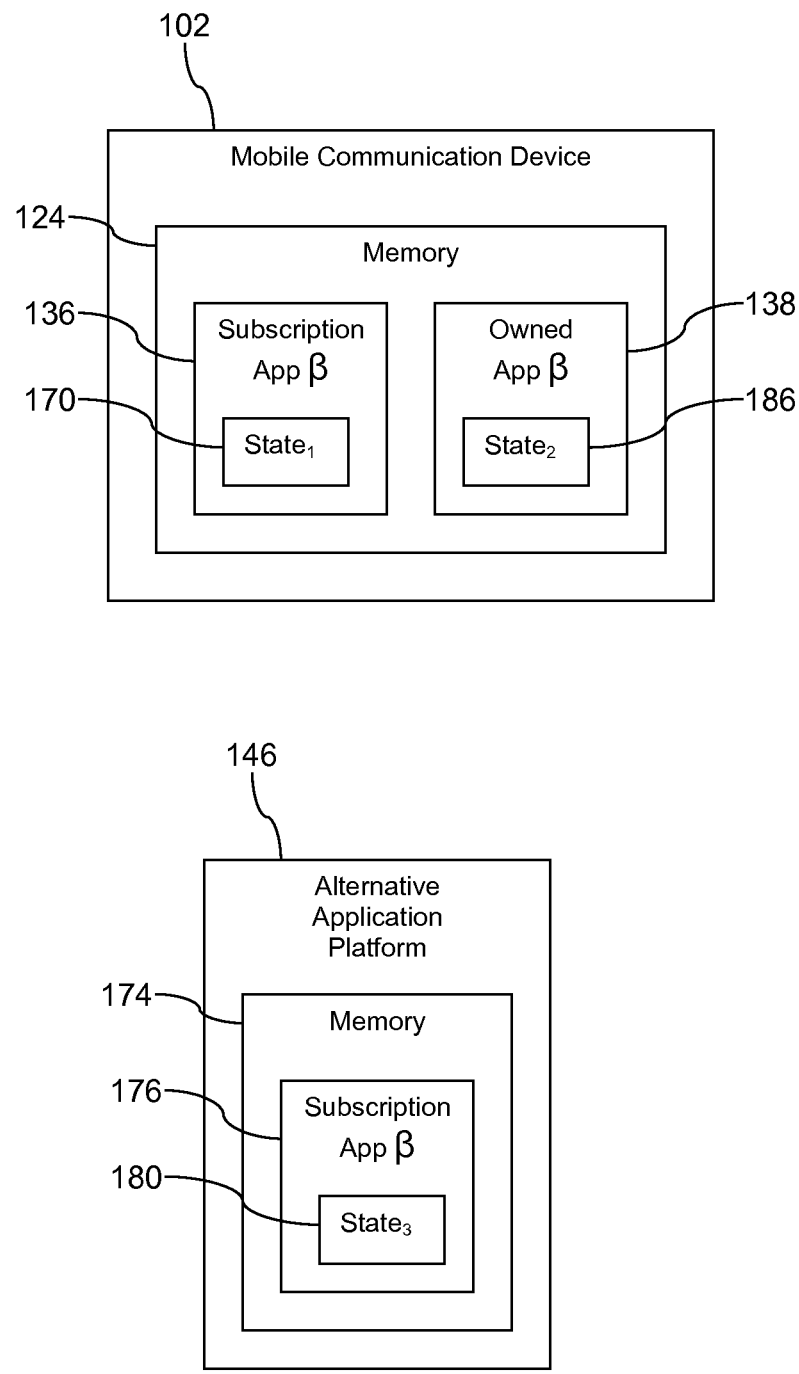
FIG. 2 is block diagram of electronic devices according to an embodiment of the disclosure.

Turning now to FIG. 2, a block diagram of how state may be stored in and transferred among applications 136, 138, and 176 is described. An application β that is available in the form of a subscription application and in the form of a purchasable application is used as an example. The subscription application β 136, 176 has a subscription application wrapper while the owned application β 138 does not have a subscription application wrapper. The subscription application β 136 comprises a $state_1$ 170, the owned application β comprises a $state_2$ 186, and the subscription application β 176 stored in a memory 174 of the alternative subscription application platform 146 comprises a $state_3$ 180.

The user of the mobile communication device 102 may use the subscription application β 136 causing changes to be made in $state_1$ 136. Later, the user may wish to use the subscription application β 176 executing on the alternative execution platform 146 based on the $state_1$ 170, so the $state_1$ 170 is exported by the mobile communication device 102 (for example, by the subscription application β 136, by the subscription management application 126, or by the subscription management client application 154) and imported by the alternative execution platform 146 (for example, by the subscription application β 176, by the subscription management application 148, or by the subscription management client application 156). As a result of this export-import cycle, the $state_3$ 180 is overwritten with the values of $state_1$ 170.

Later, subscription application β may be removed from the portfolio of subscription applications and may no longer be authorized for use as a subscription application. The user decides to purchase the corresponding owned application β 138 and to import either $state_1$ 170 or $state_3$ 180 and overwrite onto $state_2$ 186 using an export-import cycle. It is understood that the export-import cycles may be completed by the subscription management application 126 operating by itself (export-import cycle between subscription application 136 and owned application 138); completed by the subscription management applications 126, 148 collaborating with each other; or completed by the subscription management server application 152 interworking with one or more of the subscription management client application 154, 156.

Figure 3:
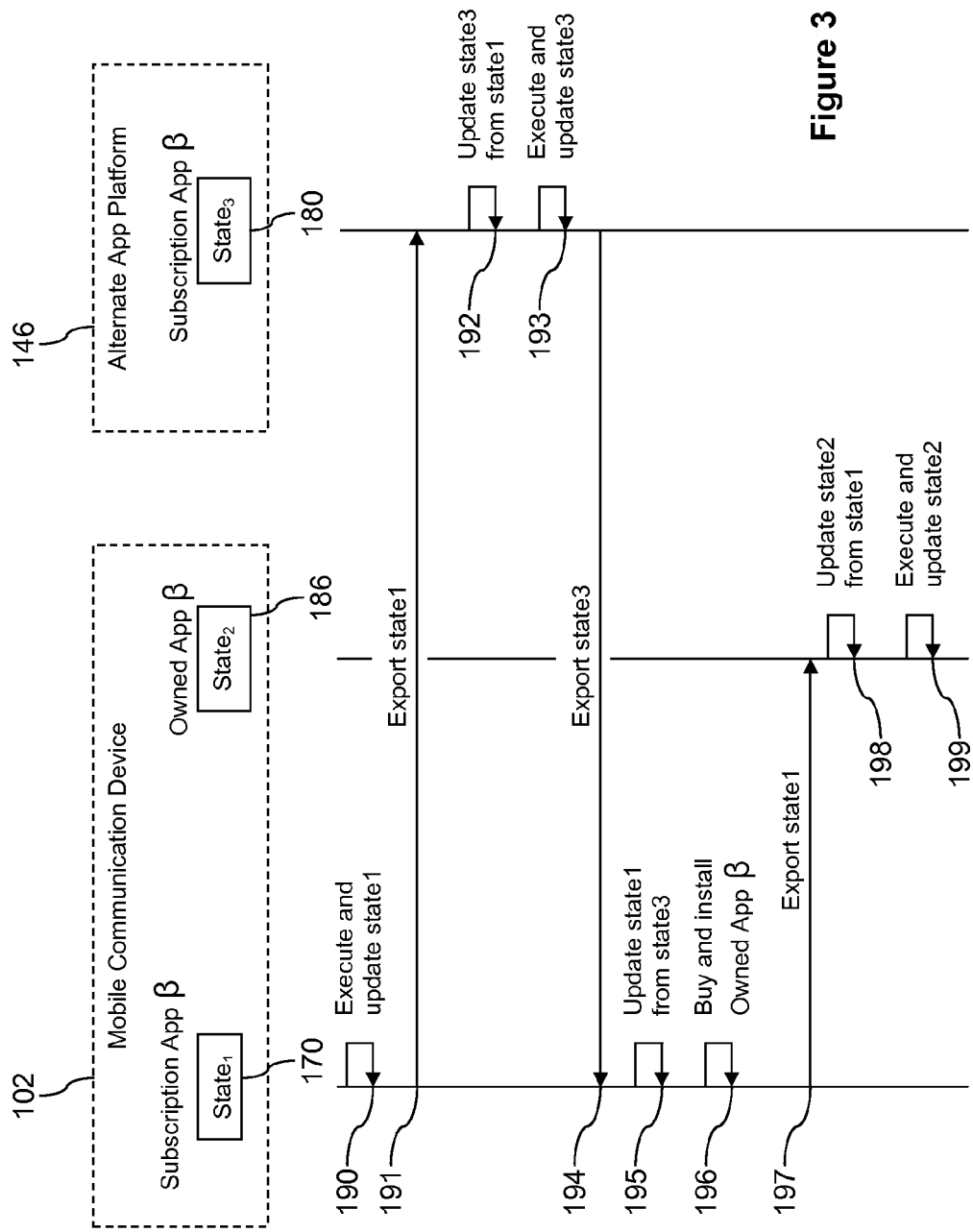
FIG. 3 is a message sequence diagram according to an embodiment of the disclosure.

Turning now to FIG. 3, a sequence diagram is described. At 190, the subscription application β 136 executes on the mobile communication device 102 and updates $state_1$ 170. At 191, the mobile communication device 102 exports $state_1$ 170 to the alternate application platform 146. At 192, the alternate application platform 146 updates its $state_3$ 180 from the $state_1$ 170 information it received. At 193, the subscription application β 176 executes on the alternate application platform 146 and updates $state_3$ 180.

At 194, the alternate application platform 146 exports $state_3$ 180 to the mobile communication device 102. At 195, the mobile communication device 102 updates its $state_1$ 170 from the $state_3$ 180 information it received. At 196, owned application β 138 is purchased and installed on the mobile communication device 102. At 197, the mobile communication device 102 exports $state_1$ 170 from the subscription application β 136 to the owned application β 138. At 198, the owned application β 138 updates its $state_2$ 186 from the $state_1$ 170 information that it received. At 199, the owned application β 138 executes and updates its $state_2$ 186. In combination with the present disclosure, one skilled in the art will readily appreciate how these sequences of operations could be extended, for example to export the $state_2$ 186 to either the $state_1$ 170 of the subscription application β 136 or to the $state_2$ 180 of the subscription application β 176 and to export the $state_3$ 180 of the subscription application β 176 to the $state_2$ 186 of the owned application β 138.

Figure 4:
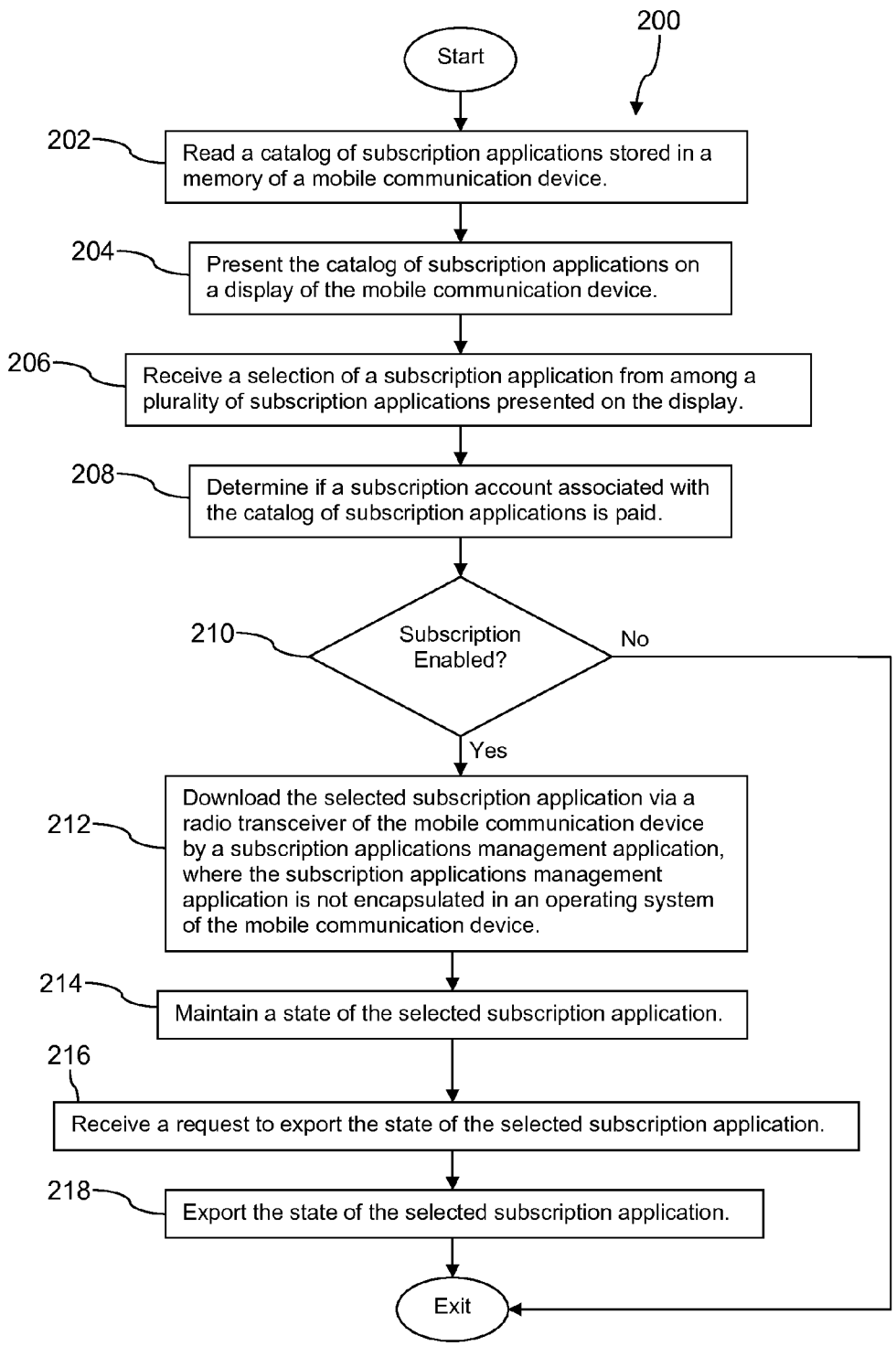
FIG. 4 is a flow chart of a method according to an embodiment of the disclosure.

Turning now to FIG. 4, a method 200 is described. At block 202, a catalog of subscription applications stored in a memory of a mobile communication device is read, for example by the subscription management application 126 or the subscription management client application 154. At block 204, the catalog of subscription applications is presented on a display of the mobile communication device, for example by the subscription management application 126 or the subscription management client application 154. A control may be provided in the display of the catalog to obtain detailed information about the subject application, for example processor or display requirements, a general description of the function of the application, and the like. At block 206, a selection of a subscription application from among a plurality of subscription applications presented on the display is received, for example by the subscription management application 126 or the subscription management client application 154. At block 208, a subscription applications account payment status is determined. At block 210, if the subscription application account is not paid, the method exits.

At block 210, if the subscription account is enabled, the method proceeds to block 212 where the selected subscription application is downloaded via a radio transceiver of the mobile communication device, for example the radio transceiver 120, by a subscription applications management application, for example the subscription management application 126. At block 214, a state of the selected subscription application is maintained, for example is stored and updated as the subscription application executes. At block 216, a request to export the state of the selected subscription application is received. At block 218, the state of the selected subscription application is exported.

Figure 5:
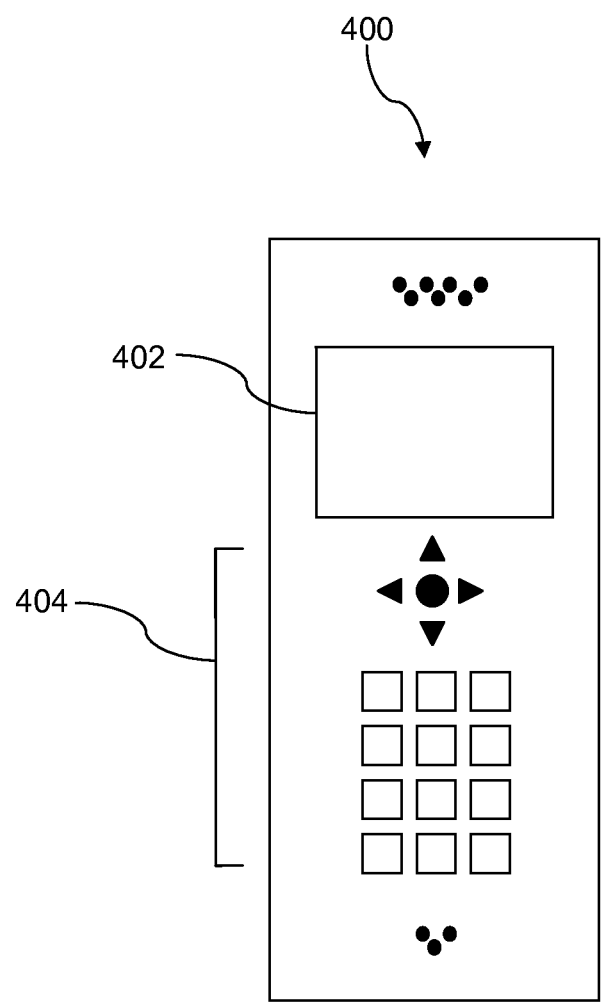
FIG. 5 is an illustration of a mobile phone according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
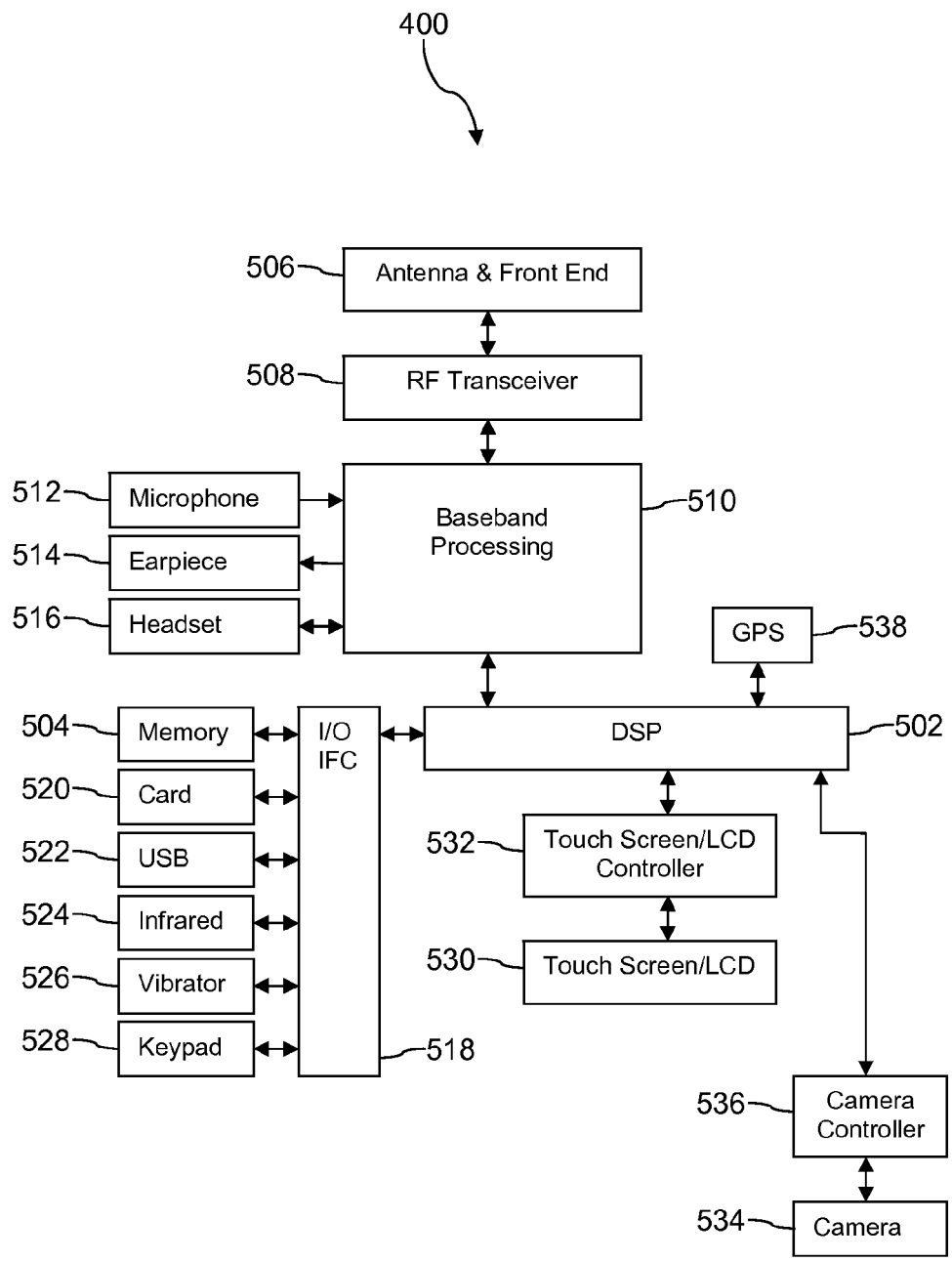
FIG. 6 is a block diagram of a hardware architecture of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
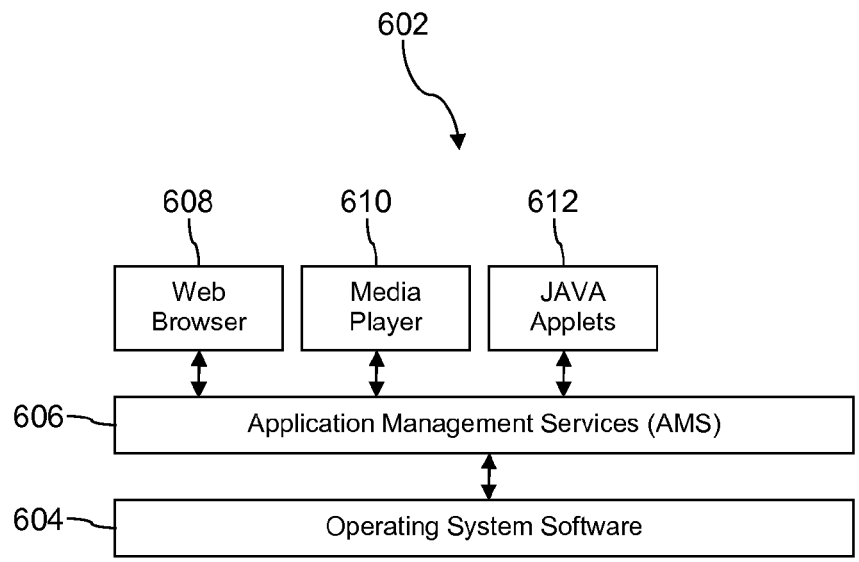
FIG. 7A is a block diagram of a first software architecture for a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
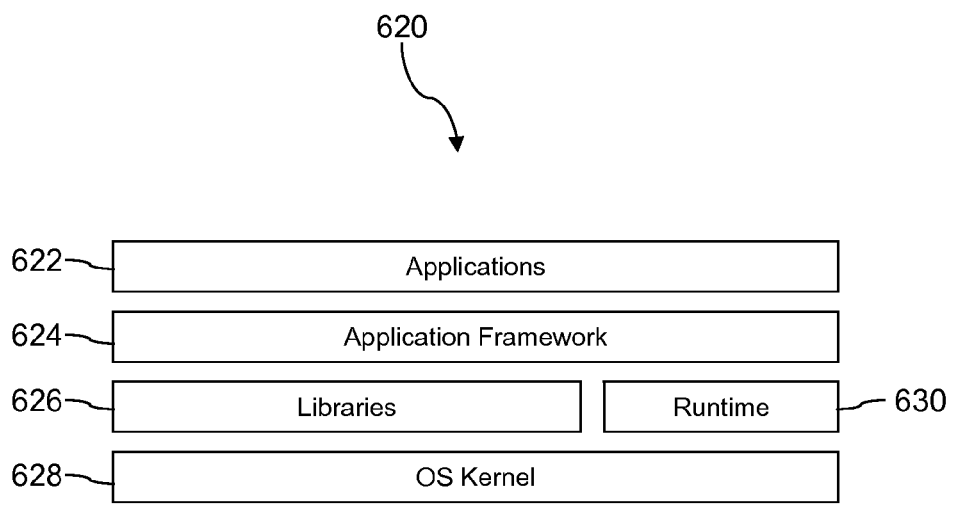
FIG. 7B is a block diagram of a second software architecture for a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
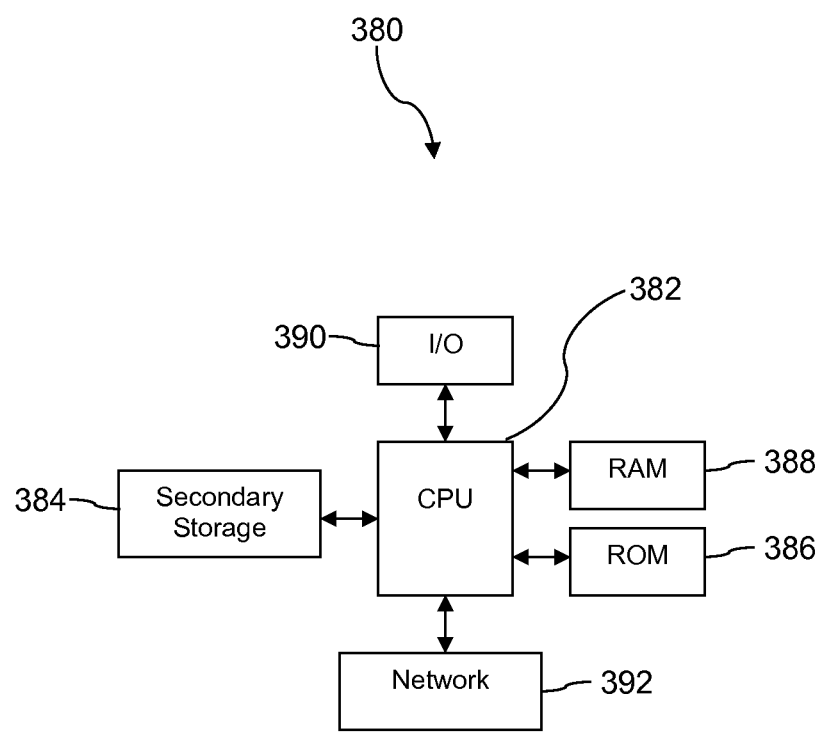
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a radio transceiver;
   a processor;
   a non-transitory memory; and
   a subscription applications management application stored in the non-transitory memory that, when executed by the processor:
   monitors a subscription applications account status of a subscription,
   presents a catalog of a plurality of subscription applications available for downloading via the radio transceiver,
   responsive to a disabled status of the subscription applications account status, blocks execution of downloaded subscription applications,
   receives a request to export state information of a specified downloaded subscription application to one of a subscription application executing on another electronic device that is not associated with the disabled status, a corresponding owned application without a wrapper executing on the mobile communication device, or a corresponding owned application without a wrapper executing on another electronic device, and
   exports state information of the specified downloaded subscription application while attempts to launch or download subscription applications on the mobile communication device are blocked due to the disabled status.

2. The device of claim 1, wherein the subscription applications comprise a wrapper that calls the subscription applications management application when a subscription application initializes, providing the subscription applications management application an opportunity to block the execution of the subscription application.

3. The device of claim 1, wherein the subscription applications management application checks the account status after a subscription period has completed.

4. The device of claim 1, wherein the subscription applications management application provides a framework for downloading subscription applications.

5. The device of claim 1, wherein the subscription applications management application further:
sends a request to import state information from an application executing on another electronic device; and
transmits imported state information to an application executing on the mobile communication device that corresponds to the application executing on the other electronic device.

6. The device of claim 1, wherein the non-transitory memory stores an account state and wherein the subscription applications management application determines the account status by reading from the account state.

7. The device of claim 1, wherein a server computer stores an account state associated with the subscription applications account of the mobile communication device and wherein the subscription applications management application monitors the subscription applications account status by accessing the account state stored by the server computer.

8. A mobile communication device, comprising:
a radio transceiver;
a processor;
a non-transitory memory;
a subscription application stored in the non-transitory memory, wherein the subscription application comprises a wrapper that checks a status of a subscription and responsive to a disabled status of the subscription, disables full execution of the subscription application; and
a subscription applications management application stored in the non-transitory memory that, when executed by the processor,
presents a catalog of a plurality of subscription applications available for downloading via the radio transceiver based on the subscription,
receives a request to export state information of a specified downloaded subscription application of the plurality of subscription applications to one of: a subscription application executing on another electronic device that is not associated with the disabled status or a corresponding owned application without a wrapper executing on the mobile communication device, and
exports state information of the specified downloaded subscription application while attempts to execute or download subscription applications on the mobile communication device are blocked due to the disabled status.

9. The device of claim 8, wherein the radio transceiver communicates according to one of a code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol.

10. The device of claim 8, wherein the state information comprises at least one of a token that authorizes play at an advanced level of a game, an accumulated game score, an accumulated numerical value, an avatar, a photograph, an editing photograph, a personal profile, and a fantasy profile.

11. The device of claim 8, wherein the state information comprises addresses input into the specified downloaded subscription application by a user of the device.

12. The device of claim 8, wherein the state information comprises a history of user actions within the specified downloaded subscription application.

13. The device of claim 8, wherein the subscription applications management application limits the number of devices on which the subscription application is downloaded.

14. The device of claim 13, wherein the subscription applications management application further blocks attempts to download the subscription application to another device if the subscription application is already installed on two devices associated with a subscriber associated with the other device.

15. The device of claim 8, wherein the mobile communication device is one of a mobile phone, a personal digital assistant, a media player, a laptop computer, a notebook computer, a tablet computer, a wearable computer, or a headset computer.

16. A method of managing subscription applications, comprising:
reading, by a mobile communication device executing a subscriptions application management application stored in non-transitory memory, a catalog of subscription applications stored in the non-transitory memory of the mobile communication device;
presenting, by executing the subscriptions application management application, the catalog of subscription applications on a display of the mobile communication device;
receiving, on the mobile communication device, a selection of a subscription application from among a plurality of subscription applications presented on the display;
determining, by executing the subscriptions application management application, if a subscription account associated with the catalog of subscription applications corresponds with an enabled status or disabled status;
responsive to determining the enabled status of the subscription account, downloading the selected subscription application via a radio transceiver of the mobile communication device by the subscription applications management application, wherein the subscription applications management application is not encapsulated in an operating system of the mobile communication device;
maintaining, by executing the subscriptions application management application, a state of the selected subscription application;
receiving a request to export the state of the selected subscription application; and
exporting, by executing the subscriptions application management application, the state of the selected subscription application even while attempts to launch or download subscription applications on the mobile communication device are blocked due to the subscription account being in the disabled status.

17. The method of claim 16, wherein the mobile communication device is one of a mobile phone, a personal digital assistant, a media player, a laptop computer, a notebook computer, a tablet computer, a wearable computer, or a headset computer.

18. The method of claim 16, wherein determining if the subscription account corresponds with the enabled status comprises examining an account state stored in the non-transitory memory of the mobile communication device.

19. The method of claim 18, further comprising sending a request for status of the subscription account to a server computer, receiving the status of the subscription account, and storing the status in the account state.

20. The method of claim 19, wherein the status of the subscription account is requested on a period determined by a subscription payment due period.

* * * * *